United States Patent
Jones (10) Patent No.: US 9,336,413 B2
(45) Date of Patent: May 10, 2016

(54) METHOD AND SYSTEM FOR FAST PERMISSION CHANGES FOR VIRTUAL ADDRESSES

(71) Applicant: Oracle International Corporation, Redwood Shores, CA (US)

(72) Inventor: Blake Alan Jones, Oakland, CA (US)

(73) Assignee: Oracle International Corporation, Redwood Shores, CA (US)

( * ) Notice: Subject to any disclaimer, the term of this patent is extended or adjusted under 35 U.S.C. 154(b) by 257 days.

(21) Appl. No.: 14/087,517

(22) Filed: Nov. 22, 2013

(65) Prior Publication Data

US 2015/0150145 A1 May 28, 2015

(51) Int. Cl.
G06F 21/62 (2013.01)
G06F 12/14 (2006.01)
G06F 21/79 (2013.01)
G06F 9/50 (2006.01)

(52) U.S. Cl.
CPC .............. *G06F 21/79* (2013.01); *G06F 9/5016* (2013.01); *G06F 12/1458* (2013.01)

(58) Field of Classification Search
CPC ............ G06F 12/0284; G06F 12/0292; G06F 12/084; G06F 12/109; G06F 12/1072; G06F 21/79; G06F 3/0622; G06F 9/5016; G06F 9/5061; G06F 9/5077; G06F 9/54; G06F 9/544; G06F 12/1416; G06F 12/1425; G06F 12/1433; G06F 12/1441; G06F 12/1458; G06F 12/1466; G06F 12/1475; G06F 12/1483; G06F 12/145
See application file for complete search history.

(56) References Cited

U.S. PATENT DOCUMENTS

| | | | | |
|---|---|---|---|---|
| 4,434,464 A * | 2/1984 | Suzuki | ............... | G06F 12/1466 711/164 |
| 6,684,305 B1 * | 1/2004 | Deneau | ............... | G06F 12/1072 711/133 |
| 2003/0233524 A1 * | 12/2003 | Poisner | ............... | G06F 12/1458 711/156 |
| 2008/0126740 A1 * | 5/2008 | Wrighton | ............... | G06F 21/53 711/208 |
| 2008/0140971 A1 * | 6/2008 | Dankel | ............... | G06F 12/0284 711/163 |
| 2008/0244155 A1 * | 10/2008 | Lee | ....................... | G06F 12/145 711/6 |
| 2009/0172330 A1 * | 7/2009 | Dewan | ............... | G06F 12/1491 711/163 |
| 2009/0322771 A1 * | 12/2009 | Eilam | ............... | G06F 12/0284 345/543 |

* cited by examiner

*Primary Examiner* — Michael Krofcheck
(74) *Attorney, Agent, or Firm* — Osha Liang LLP (57) ABSTRACT

A method for accessing shared memory, the method includes loading a private context ID into a private context ID register, where the first private context ID enables a thread to access a private memory region only accessible by the thread. The method further includes receiving, from the thread, a first request to access a shared memory region, loading a shared context ID into a shared context register, permitting, by a memory management unit (MMU), the thread to access the shared memory region using the shared context ID, and receiving, from the thread, a second request to disable access to the shared memory region. The method further includes removing, in response to the second request, the shared context ID from the shared context ID register, where after removing the shared context ID from the shared context ID register the thread is no longer able to access the shared memory region.

20 Claims, 11 Drawing Sheets

METHOD AND SYSTEM FOR FAST PERMISSION CHANGES FOR VIRTUAL ADDRESSES

BACKGROUND

Access to a shared memory region on a thread-level basis may be implemented using Translation Lookaside Buffers (TLBs). The process of changing which threads can access the shared memory region is facilitated using time-consuming TLB shoot-downs. Through alternate uses of a private context ID register in some systems, TLB shoot-downs may be reduced. Similarly, in other systems, alternate uses of a current page table register may also reduce TLB shoot-downs.

SUMMARY

In general, in one aspect, the invention relates to a method for accessing shared memory, the method including: loading a first private context ID into a private context ID register, where the first private context ID enables a first thread to access a first private memory region only accessible by the first thread; receiving, from the first thread, a first request to access a shared memory region; loading a shared context ID into a shared context register; permitting, by a memory management unit (MMU), the first thread to access the shared memory region using the shared context ID; receiving, from the first thread, a second request to disable access to the shared memory region; and removing, in response to the second request, the shared context ID from the shared context ID register, where after removing the shared context ID from the shared context ID register the first thread is no longer able to access the shared memory region.

In general, in one aspect, the invention relates to a method for accessing shared memory, the method including: receiving, from a first thread, a first request to access a shared memory region; loading a first page table address into a current page table register, where the first page table address enables the first thread to access a first private memory region associated with the first thread and to access the shared memory region; permitting, by a MMU, the first thread to access the shared memory region using the first page table address; receiving, from the first thread, a second request to disable access to the shared memory region; removing, in response to the second request, the first page table address from the current page table register, where after removing the first page table address from the current page table register the first thread is no longer able to access the shared memory region; and loading, after the removing, a second page table address into the current page table register, where the second page table address enables the first thread to access only the first private memory region.

In general, in one aspect, the invention relates to a system for improving access permissions, the system including: a private context ID register; a shared context ID register; a shared memory region, where access to the shared memory region is managed by an operating system and a memory management unit (MMU); a first private memory region, where the first private memory region is managed by the operating system and the MMU; the operating system configured to: load a first private context ID into a private context ID register, where the first private context ID enables a first thread to access the first private memory region only accessible by the first thread; receive, from a first thread, a first request to enable access to the shared memory region; load the shared context ID into the shared context ID register; receive, from the first thread, a second request to disable access to the shared memory region; and remove, in response to the second request, the shared context ID from the shared context ID register, where after removing the shared context ID from the shared context ID register the first thread is no longer able to access the shared memory region; the memory management unit configured to: permit the first thread to access the shared memory region using the shared context ID; and an application including: the first thread configured to: send, to the operating system, the first request to enable access to the shared memory region; and send, to the operating system, the second request to disable access to the shared memory region.

In general, in one aspect, the invention relates to a system for improving access permissions, including: a current page table register; a shared memory region, where access to the shared memory region is managed by an operating system and a memory management unit (MMU); a first private memory region, where the first private memory region is managed by the operating system and the MMU; the operating system configured to: receive, from a first thread, a first request to enable access to the shared memory region; load a first page table address into the current page table register, where the first page table address enables the first thread to access a first private memory region associated with the first thread and to access the shared memory region; receive, from the first thread, a second request to disable access to the shared memory region; remove, in response to the second request, the first page table address from the current page table register, where after removing the first page table address from the current page table register the first thread is no longer able to access the shared memory region; and load, after removing, a second page table address into the current page table register, where the second page table address enables the first thread access to only the first private memory region; the memory management unit (MMU) configured to: permit the first thread to access the shared memory region using the first page table; and an application including: the first thread configured to: send, to the operating system, the first request to enable access to the shared memory region; and send, to the operating system, the second request to disable access to the shared memory region.

In general, in one aspect, the invention relates to a non-transitory computer readable medium including instructions, which when executed by a processor perform a method for accessing shared memory, the method including: loading a first private context ID into a private context ID register; where the first private context ID enables a first thread to access a first private memory region only accessible by the first thread; receiving, from the first thread, a first request to access a shared memory region; loading a shared context ID into a shared context register; permitting, by a memory management unit (MMU), the first thread to access the shared memory region using the shared context ID; receiving, from the first thread, a second request to disable access to the shared memory region; and removing, in response to the second request, the shared context ID from the shared context ID register, where after removing the shared context ID from the shared context ID register the first thread is no longer able to access the shared memory region.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-9B, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method that uses a shared context register or a page table address register to control access to a shared memory region. Further, embodiments of the invention restrict access to a shared memory region to individual threads, processes, or applications. Further, embodiments of the invention enable applications executing on the system to control which threads have access to the shared memory by instructing the operating system to load values into (or remove values from) the shared context register or page table address register.

Figure 1:
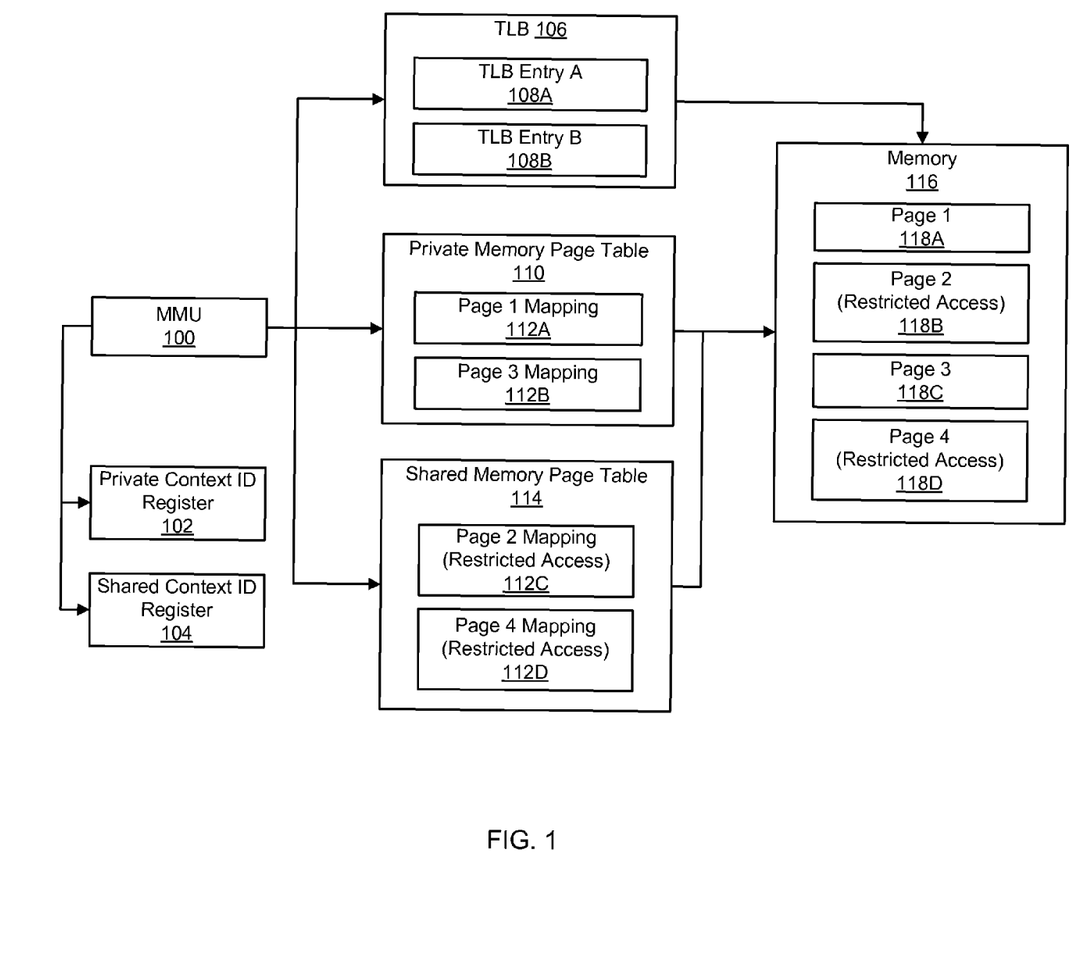
FIG. 1 shows a system in accordance with one or more embodiments of the invention.

Referring to FIG. 1, a system in accordance with one embodiment of the invention is shown. The system includes a Memory Management Unit (MMU) (100) operatively connected to a private context ID register (102) and a shared context ID register (104), which are used to determine access privileges of a thread to a private memory region (not shown) and a shared memory region (not shown). The process of granting access to memory regions is improved through the use of a Translation Lookaside Buffer (TLB) (106).

In one embodiment of the invention, the MMU (100) is a computer component that handles requests to access regions of memory. Further, the MMU may access the TLB (106), a private memory page table (110), and a shared memory page table (114). More specifically, the MMU may grant or deny a thread, process, or application access to a particular memory region based on the values in the private context ID register and the shared context ID register. The MMU may also include functionality to translate virtual addresses into corresponding physical addresses in memory. When the MMU processes a memory access request from a thread, the MMU checks the TLB (106) for a corresponding cache entry as explained below. If an entry is not found, the MMU uses the private memory page table (110) or shared memory page table (114) to determine the corresponding physical address.

In one embodiment of the invention, the private context ID register (102) is a small amount of memory that is used to store a private context ID. A private context ID identifies a thread, process, or application that is accessing memory. Loading a predetermined private context ID into the private context ID register may grant a thread, process, or application access to a private memory region. Further, as described below, loading the private context ID may also allow the thread to access all TLB entries corresponding to the given private context ID. Each thread is associated with a private context ID that corresponds to a private memory region. The private context ID may be unique to a process or an application. Said another way, all of the threads in a process of an application may have the same private context ID, making the private context ID unique to the process.

In one embodiment of the invention, the shared context ID register (104) is a small amount of memory that is used to store a shared context ID. A shared context ID corresponds to access privileges for a thread, process, or application to a particular shared memory region. Loading a shared context ID into the shared context ID register may grant a thread, process, or application access to the corresponding shared memory region. Further, as described below, loading the shared context ID may also allow the thread to see all TLB entries corresponding to the given shared context ID.

In one embodiment of the invention, the TLB (106) caches previously translated virtual addresses and the corresponding physical addresses in memory. A TLB is a cache that stores a predetermined number of the most recent translations from virtual addresses to physical addresses by a thread associated with a given context ID. Said another way, a thread may use TLB entries associated with the same context ID to obtain a recently calculated physical address corresponding to the requested virtual address. The TLB stores these values in TLB entries (108A and 108B). For example, when a thread requests to access the shared memory region, the MMU may check the TLB (106) for an entry with the given shared context ID and requested virtual address. If a TLB entry exists, the MMU may determine the physical address without using a page table.

In one embodiment of the invention, a private memory page table (110) is a table of mappings (112A and 112B) from virtual addresses to physical addresses in a private memory region.

In one embodiment of the invention, a private memory region (not shown) is a region in memory that is designated as accessible by a thread or group of threads. The private memory region may be defined prior to use of the private context ID register. The private memory region may be organized into pages, each of which is the smallest unit of memory that the operating system may allocate. Based on FIG. 1, the private memory region includes the pages (118A and 118C) mapped (112A and 112B) by the private memory page table.

In one embodiment of the invention, a shared memory page table (114) is a table of mappings (112A-112D) from virtual addresses to physical addresses in a shared memory region.

In one embodiment of the invention, a shared memory region (not shown) is a region in memory that is designated as accessible by multiple threads. The shared memory region may be defined prior to use of the shared context ID register. The shared memory region may be organized into pages. Based on FIG. 1, the shared memory region includes pages (118B and 118D) mapped (112C and 112D) by the shared memory page table.

In one embodiment of the invention, the memory (116) is the total memory in hardware for the given computing device hosting the memory. As shown in FIG. 1, the memory includes the memory regions mapped by the shared memory page table and the private memory page table.

The invention is not limited to the system shown in FIG. 1.

Figure 2:
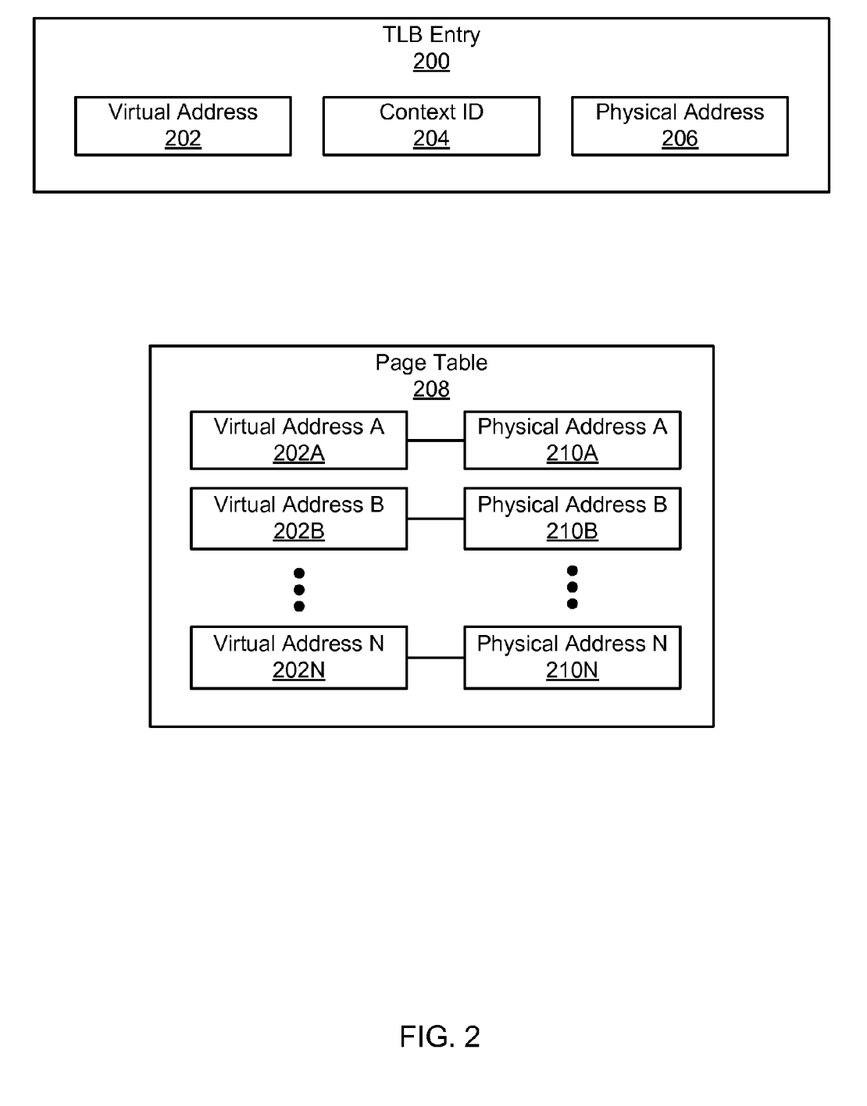
FIG. 2 shows data structures of various system components in accordance with one or more embodiments of the invention.

FIG. 2 shows data structures of various system components in accordance with one or more embodiments of the invention.

In one embodiment of the invention, a TLB entry (200) is an entry in the TLB that is used to store previously translated virtual addresses with corresponding physical address information. Each TLB entry includes a virtual address (202), a context ID (204), and a physical address (206). For a system, such as the one shown in FIG. 1, the context ID (204) may be a private context ID or a shared context ID depending on which memory region the thread accesses. For a system, such as the one shown in FIG. 5, the context ID may be a private page table address or hybrid page table address depending on which memory region the thread accesses. For example, in a system as in FIG. 1, if a thread with a private context ID of x1234 accesses a virtual address of x3045, the TLB entry may include a virtual address of x3045, a context ID of x1234, and a physical address of x0005.

In one embodiment of the invention, a page table (208) stores the mappings between virtual addresses (202A-202N) and corresponding physical addresses (210A-210N) in a particular memory region. The page tables may be used to designate a set of virtual addresses that map to a set of physical addresses in a private or shared memory region. For example, if the private memory region includes virtual addresses x0000 to x0050, then the private memory page table may include mappings from a set of virtual addresses to a corresponding set of physical addresses from x0075 to x0005.

Figure 3:
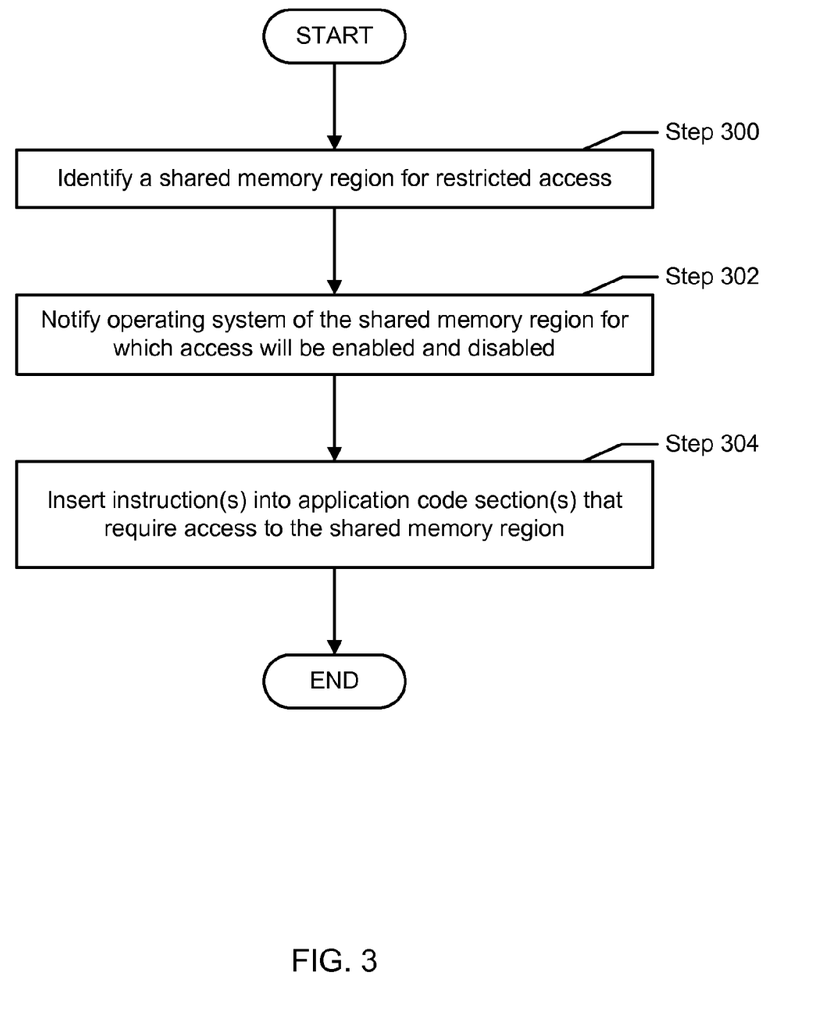
FIG. 3 shows a flowchart for initializing a shared memory region in accordance with one or more embodiments of the invention.
Figure 4:
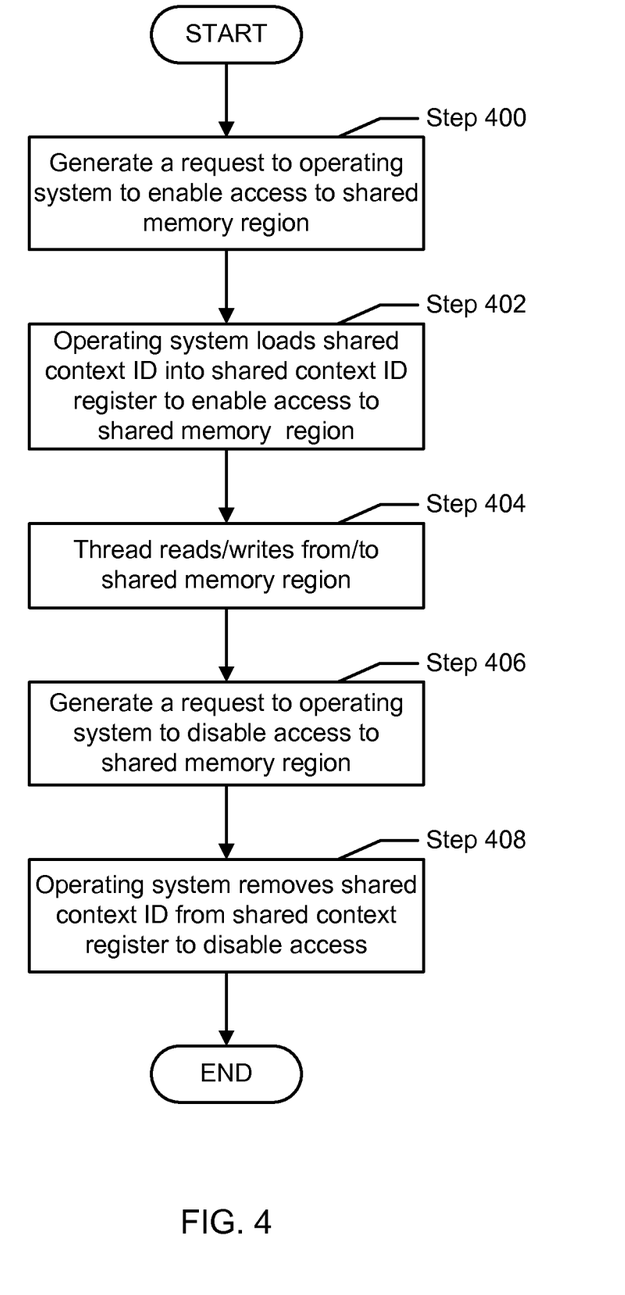
FIG. 4 shows a flowchart for making an operating system request in accordance with one or more embodiments of the invention.

FIGS. 3 and 4 show flowcharts in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in any of the flowcharts may be performed in parallel with the steps shown in any of the other flowcharts.

Referring to FIG. 3, a flowchart for initializing a shared memory region in accordance with one or more embodiments of the invention is shown. In Step 300, a shared memory region is identified by the application. For example, the application may define a shared memory region with virtual addresses from x00DD to x0100.

In one embodiment of the invention, the application may also define a private memory region. Following the example above, the application may define a non-overlapping private memory region as having virtual addresses from x0110 to x0150. Alternatively, the application may define the shared memory region(s) and the operating system may define the private memory region(s).

In Step 302, the operating system is notified of the shared memory region for which access will be enabled and disabled. In one embodiment of the invention, any pre-existing TLB entries including an address in the shared memory region and a private context ID are removed. Further, any data structures, such as page tables, that grant access to the shared memory region from the private context ID are invalidated. For example, the operating system may be notified of the shared memory region with virtual addresses spanning from x00DD to x0100.

In one embodiment of the invention, the operating system may select a shared context ID for the shared memory region. For example, the operating system may select a shared context ID of xAAAA for the shared memory region.

In Step 304, instructions are inserted into application code sections that require access to the shared memory region. Specifically, the instructions that generate a request to the operating system to enable access to the shared memory region are added at some point before the instructions that access the shared memory region. Said another way, the code section is modified to send a request to the operating system to enable access before a thread accesses the shared memory region. Further, the location of the instructions to send a request to the operating system to enable access may vary based on implementation. Specifically, the instructions may be located within the code section at any point prior to the instructions requiring access to the shared memory region or prior to the entire code section.

Likewise, the instructions that generate a request to the operating system to disable access to the shared memory region are added after the instructions that access the shared memory region. Said another way, the code section is modified to send a request to the operating system to disable access after a thread accesses the shared memory region. The code section may be a routine in the application code. For example, if an application routine includes instructions to read from the shared memory region, instructions to send a request to enable access may be placed at some point before the read instructions and instructions to send a request to disable access may be placed at some point after the read instructions. Further, the location of the instruction to send a request to the operating system to disable access may vary based on implementation. Specifically, the instructions may be located within the code section at any point after the instructions requiring access to the shared memory region or after the entire code section.

Once the shared memory region is initialized as in FIG. 3, the application code may be executed using at least one process. Each process may include a group of threads in which a thread of the group of threads may execute a code section that requires access to the shared memory region. With the code modified as shown in FIG. 3, the thread may first execute the inserted instructions from Step 304 before executing instructions that access the shared memory region. Said another way, as the thread executes application code, the thread may encounter a code section requiring access to the shared memory region and subsequently send a request to the operating system to enable access to the shared memory region, as is shown in FIG. 4.

Referring to FIG. 4, a flowchart for an application making an operating system request in accordance with one or more embodiments of the invention is shown. Specifically, the thread encounters a modified code section that requires access to the shared memory region and as a result sends a request to the operating system to enable access to the shared memory region prior to accessing the shared memory region.

In Step 400, the thread executes the inserted instructions from Step 304 and the application generates a request to the operating system to enable access for the thread to a shared memory region. For example, the request to the operating system may include a request for enabling access to a shared memory region spanning from x0200 to x0250.

In Step 402, the operating system loads the corresponding shared context ID into the shared context ID register. Following the above example, the operating system may load a shared context ID of xAAAA.

In Step 404, the thread accesses the shared memory region and may read from shared memory and/or write to the shared memory region. Specifically, the thread may execute instructions after the instructions that send a request to enable access but before the instructions that send a request to disable access. With the shared context ID in the shared context ID register, the thread may also use preexisting TLB entries with the shared context ID. As the thread accesses the shared memory region, TLB entries with the shared context ID are created. For example, the thread may access TLB entries including the shared context ID of xAAAA.

In Step 406, after the thread accesses the shared memory region, the thread executes the inserted instructions from Step 304 and the application generates a request to the operating system to disable access to the shared memory region. For example, the request to the operating system may include a request for disabling access to the shared memory region spanning x0200 to x0250.

In Step 408, the operating system removes the shared context ID from the shared context ID register. In one embodiment of the invention, the operating system may leave the shared context ID register with a value of null. In another embodiment of the invention, the operating system may insert a predetermined value into the shared context ID register. With the removal of the shared context ID, the thread may not access TLB entries that include the shared context ID.

Some memory systems (as described below in FIGS. 5-7), in lieu of using a shared context ID register, have a current page table register that points to a particular page table. Accordingly, a given thread may only access the memory region mapped by the page table to which the current page table register points. Therefore, the system maintains several page tables that map to particular memory regions. Specifically, the memory system may maintain a page table that maps to a private memory region and another page table that maps to both the private memory region and shared memory region. This configuration of page tables may allow a thread to access either only the private memory region or both the private memory region and the shared memory region.

Figure 5:
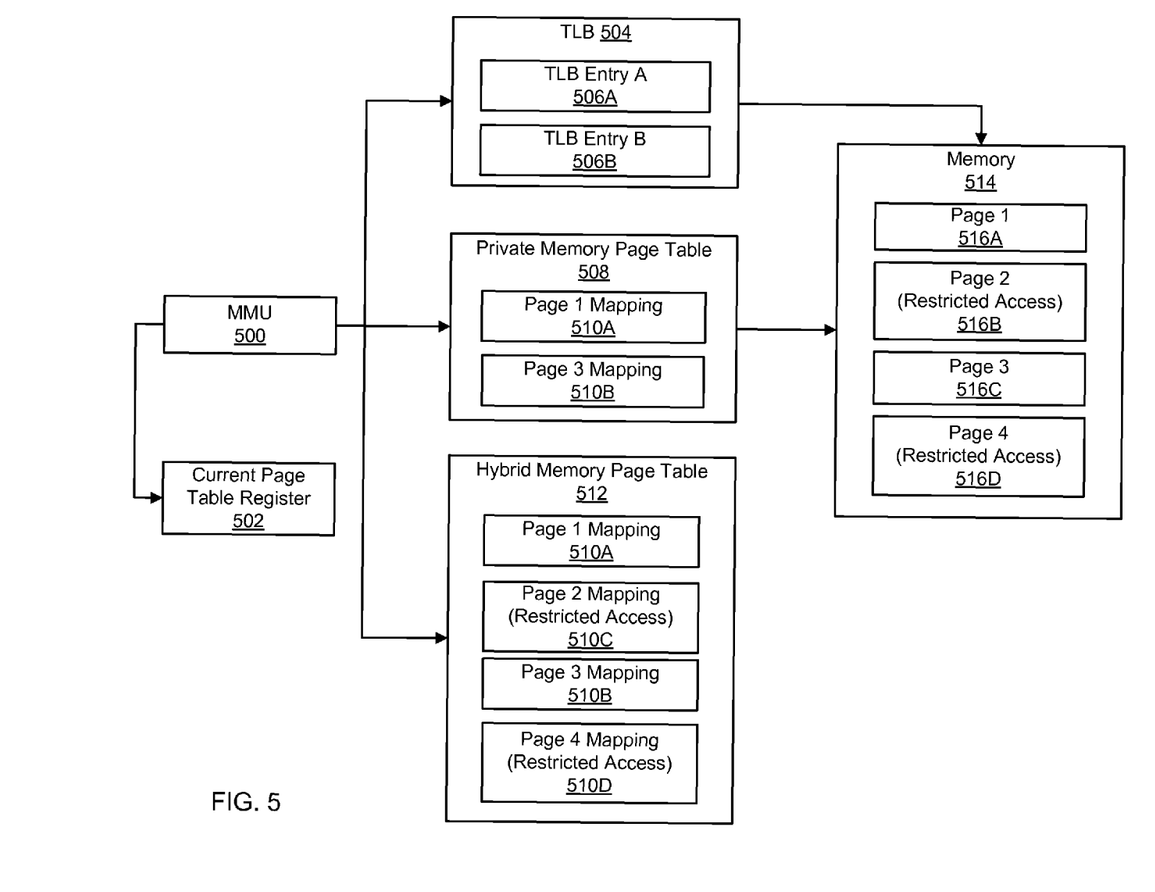
FIG. 5 shows a system in accordance with one or more embodiments of the invention.

Referring to FIG. 5, a system using page tables in accordance with one or more embodiments of the invention is shown. The system includes a MMU (500) operatively connected to a current page table address register (502), which is used to determine access privileges to a private memory region (not shown) and a shared memory region (not shown). The process of granting access to memory regions is improved through the use of a TLB (504).

In one embodiment of the invention, the MMU (500) is a computer component that handles requests to access regions of memory. Further, the MMU may access a TLB (504), a private memory page table (508), and a hybrid memory page table (512). More specifically, the MMU may grant or deny a thread, process, or application access to a particular memory region based on the value in the current page table register. The MMU also includes functionality to translate virtual addresses into corresponding physical addresses in memory. When the MMU processes an address access request from a thread, the MMU checks the TLB (504) for a corresponding cache entry. If an entry is not found, the MMU uses the private memory page table (508) or hybrid memory page table (512) to determine the corresponding physical address.

In one embodiment of the invention, the current page table register (502) is a small amount of memory that is used to store a page table address corresponding to a page table that may be used to access a memory region. The page table that the current page table register points to includes mappings of virtual addresses to physical addresses within a certain region of memory. The current page table register may only point to one page table at a time, allowing the thread to access only the region mapped by one page table at any given time.

In one embodiment of the invention, the TLB (504) caches virtual addresses and the corresponding physical addresses in memory associated with a given context ID. The TLB stores these values in TLB entries (506A-506B), as defined in FIG. 2. For this system, the context ID used in a TLB entry is the address of the page table that is currently being pointed to, which is the value in the current page table register. For example, when a thread requests to access the shared memory region, the MMU may check the TLB (504) for an entry with the requested virtual address and a context ID of the current page table address. If a TLB entry exists, the MMU may determine the corresponding physical address without using a page table.

In one embodiment of the invention, a private memory page table (508) is a table of mappings (510A and 510B) from virtual addresses to physical addresses in a private memory region.

In one embodiment of the invention, a private memory region (not shown) is a region in memory that is designated as accessible by a thread or group of threads. The private memory region may be defined prior to use of the private context ID register. The private memory region may be organized into pages. Based on FIG. 5, the private memory region includes pages (516A and 516C) mapped (510A and 510B) by the private memory page table.

In one embodiment of the invention, a hybrid memory page table (512) is a table of mappings from virtual addresses to physical addresses in a shared memory region that is designated as accessible by an application. In accordance with one embodiment of this invention, the hybrid memory page table includes mappings to both a shared memory region and a private memory region. Referring to FIG. 5, the hybrid memory page table (512) includes all the mappings to the private memory region (510A and 510B) as well as the mappings to the shared memory region (510C and 510D).

In one embodiment of the invention, the memory (514) is the total memory in hardware for the given computing device hosting the memory. As shown on FIG. 5, the memory includes the memory regions mapped by the hybrid and private page tables.

Figure 6:
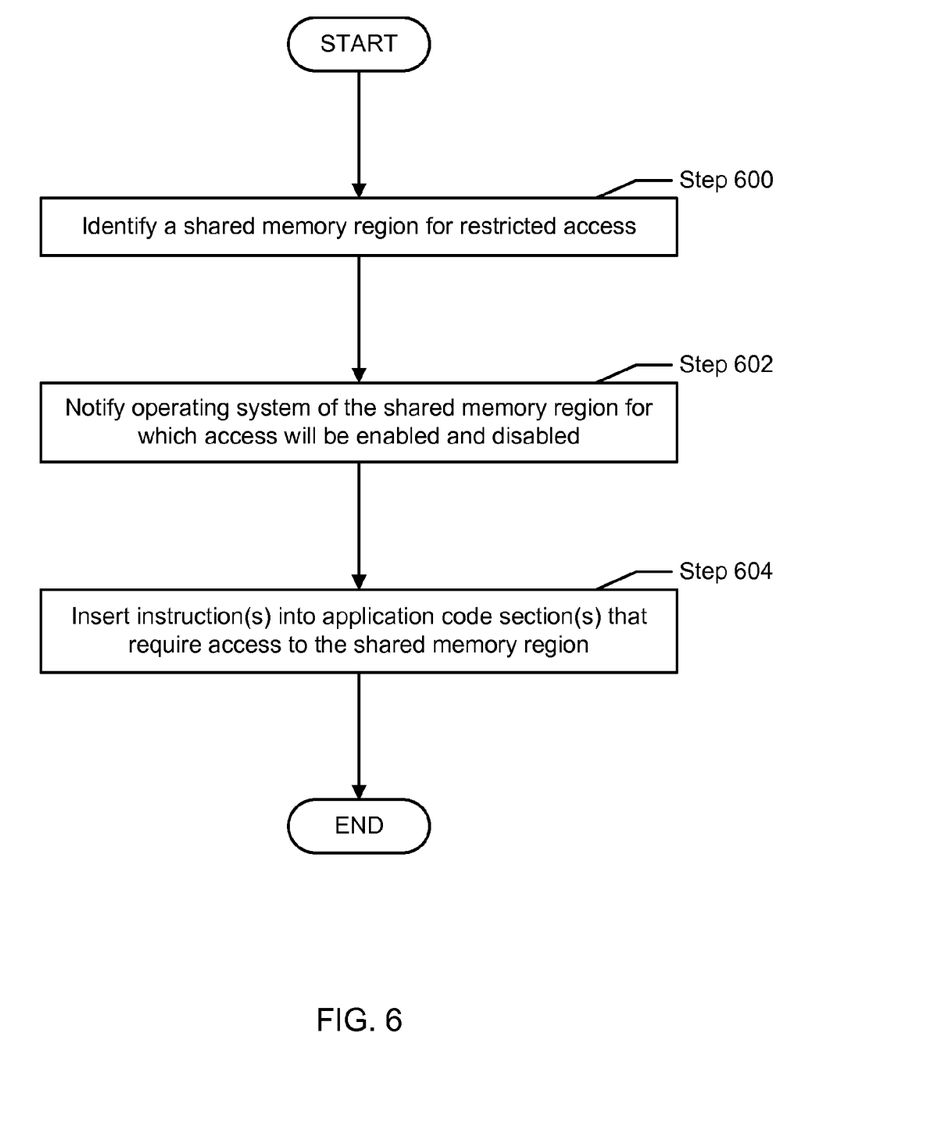
FIG. 6 shows a flowchart for initializing a shared memory region in accordance with one or more embodiments of the invention.
Figure 7:
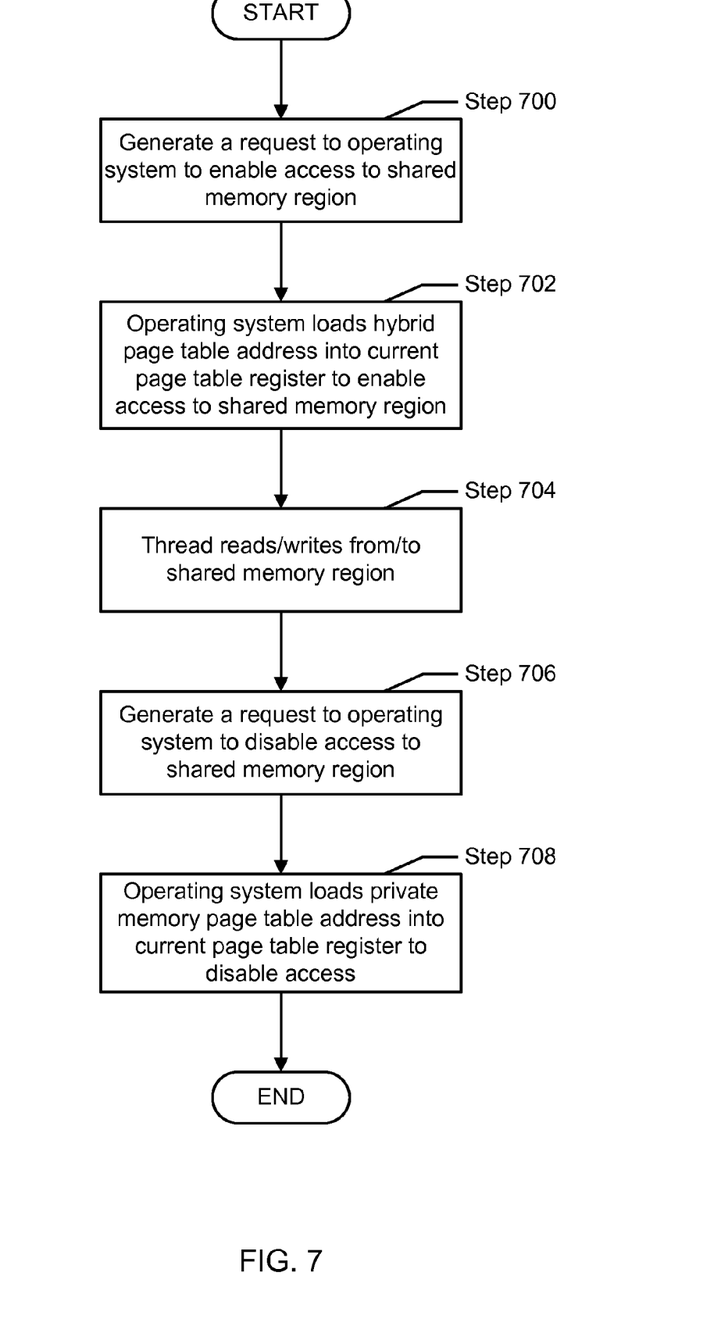
FIG. 7 shows a flowchart for making an operating system request in accordance with one or more embodiments of the invention.

FIGS. 6 and 7 show flowcharts in accordance with one or more embodiments of the invention. While the various steps in the flowcharts are presented and described sequentially, one of ordinary skill will appreciate that some or all of the steps may be executed in different orders, may be combined or omitted, and some or all of the steps may be executed in parallel. In one embodiment of the invention, the steps shown in any of the flowcharts may be performed in parallel with the steps shown in any of the other flowcharts.

Referring to FIG. 6, a flowchart for initializing a shared memory region in accordance with one or more embodiments of the invention is shown. In Step 600, a shared memory region is identified by the application. For example, the application may define a shared memory region with virtual addresses spanning from x00FF to x0300. In one embodiment of the invention, the application may also determine a private memory region. Alternatively, the private memory region may be determined by the operating system.

In Step 602, the operating system is notified of the shared memory region for which access will be enabled and disabled. For example, the operating system may be notified of the shared memory region with virtual addresses spanning from x00FF to x0300. In one embodiment of the invention, the operating system may generate a hybrid page table with mappings to both the private memory region and the shared memory region. Further, the operating system may remove any mappings to the shared memory region that are included in the private page table. The address of the hybrid page table may then be used as the context ID for TLB entries.

In Step 604, instructions are inserted into application code sections that require access to the shared memory region. Specifically, the instructions that generate a request to the operating system to enable access to the shared memory region are added at some point before the instructions that access the shared memory region. Said another way, the code section is modified to send a request to the operating system to enable access before a thread accesses the shared memory region. Further, the location of the instructions to send a request to the operating system to enable access may vary based on implementation. Specifically, the instructions may be located within the code section at any point prior to the instructions requiring access to the shared memory region or prior to the entire code section.

Likewise, the instructions that generate a request to the operating system to disable access to the shared memory region are added after the instructions that access the shared memory region. Said another way, the code section is modified to send a request to the operating system to disable access after a thread accesses the shared memory region. The code section may be a routine in the application code. For example, if an application routine includes instructions to read from the shared memory region, instructions to send a request to enable access may be placed at some point before the read instructions and instructions to send a request to disable access may be placed at some point after the read instructions. Further, the location of the instruction to send a request to the operating system to disable access may vary based on implementation. Specifically, the instructions may be located within the code section at any point after the instructions requiring access to the shared memory region or after the entire code section.

Once the shared memory region is initialized as in FIG. 6, the application code may be executed using at least one process. Each process may include a group of threads in which a thread may execute a code section that requires access to the shared memory region. With the code modified as shown in FIG. 6, the thread may first execute the inserted instructions from Step 604 before executing instructions that access the shared memory region. Said another way, as the thread executes application code, the thread may encounter a code section requiring access to the shared memory region and subsequently send a request to the operating system to enable access to the shared memory region, as is shown in FIG. 7.

Referring to FIG. 7, a flowchart for an application making an operating system request in accordance with one or more embodiments of the invention is shown. Specifically, the thread encounters a modified code section that requires access to the shared memory region and as a result sends a request to the operating system to enable access to the shared memory region prior to accessing the shared memory region.

In Step 700, thread executes the inserted instructions from Step 604 and the application generates a request to the operating system to enable access for the thread to a shared memory region. In Step 702, the operating system loads the hybrid page table address into the current page table register.

In Step 704, the thread accesses the shared memory region and may read from shared memory and/or write to the shared memory region. The thread may also access the private memory region that is included in the hybrid memory page table. Specifically, the thread may execute instructions after the instructions that send a request to enable access but before the instructions that send a request to disable access. As the thread continues execution of the application code while access to the shared memory region is enabled, TLB entries with a context ID of the hybrid memory page table are created. Accordingly, the thread may access only TLB entries with a context ID of the hybrid memory page table address.

In Step 706, after the thread accesses the shared memory region, the thread executes the inserted instructions from Step 604 and the application generates a request to the operating system to disable access to the shared memory region. In Step 708, the operating system loads the private memory page table address into the current page table register. As the context ID of the thread is the private page table address, the thread may not access any of the TLB entries created while access to the shared memory region was enabled.

The following discussion describes examples in accordance with one or more embodiments of the invention.

Figure 8A:
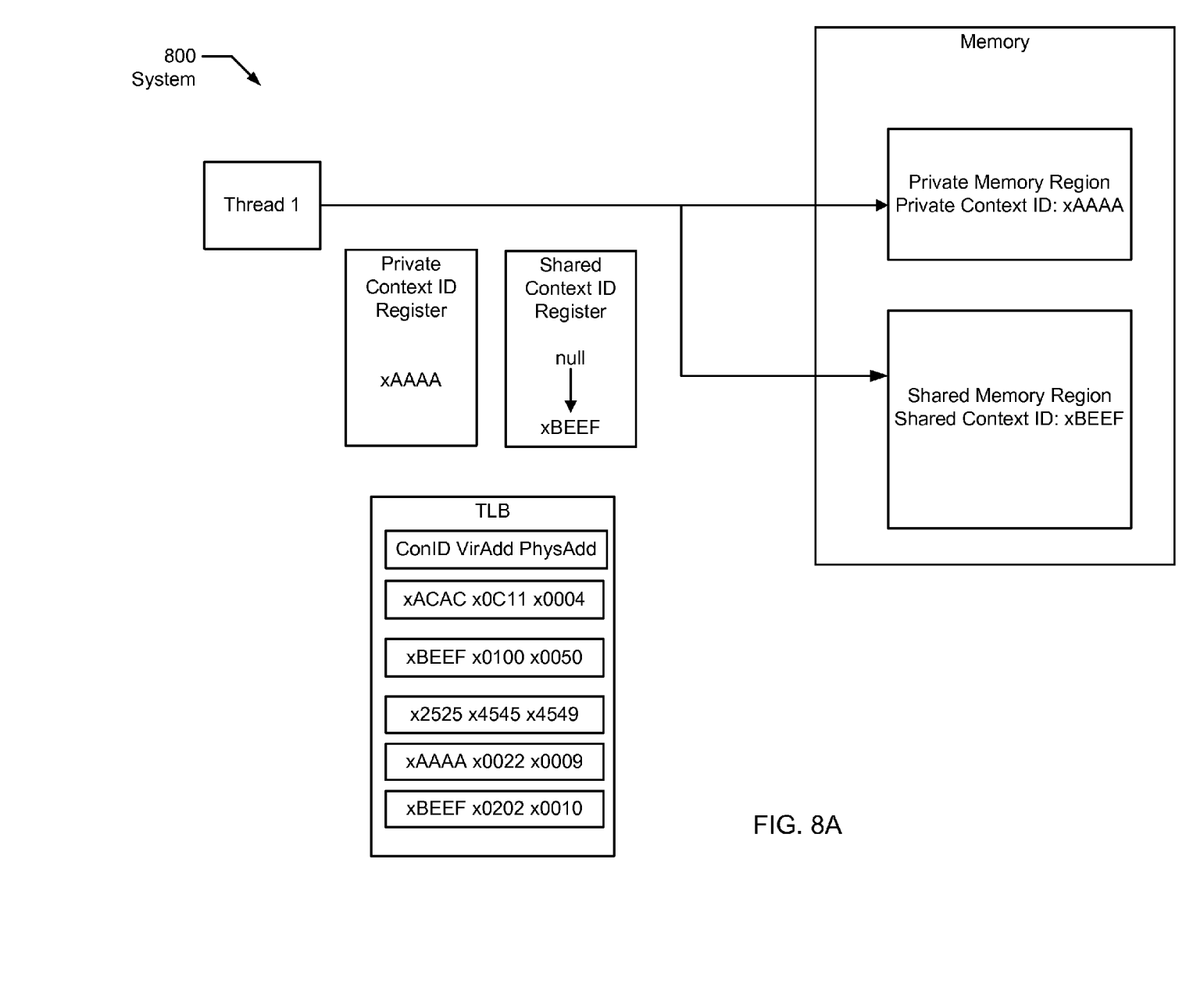
FIGS. 8A-B show an example in accordance with one or more embodiments of the invention.
Figure 8B:
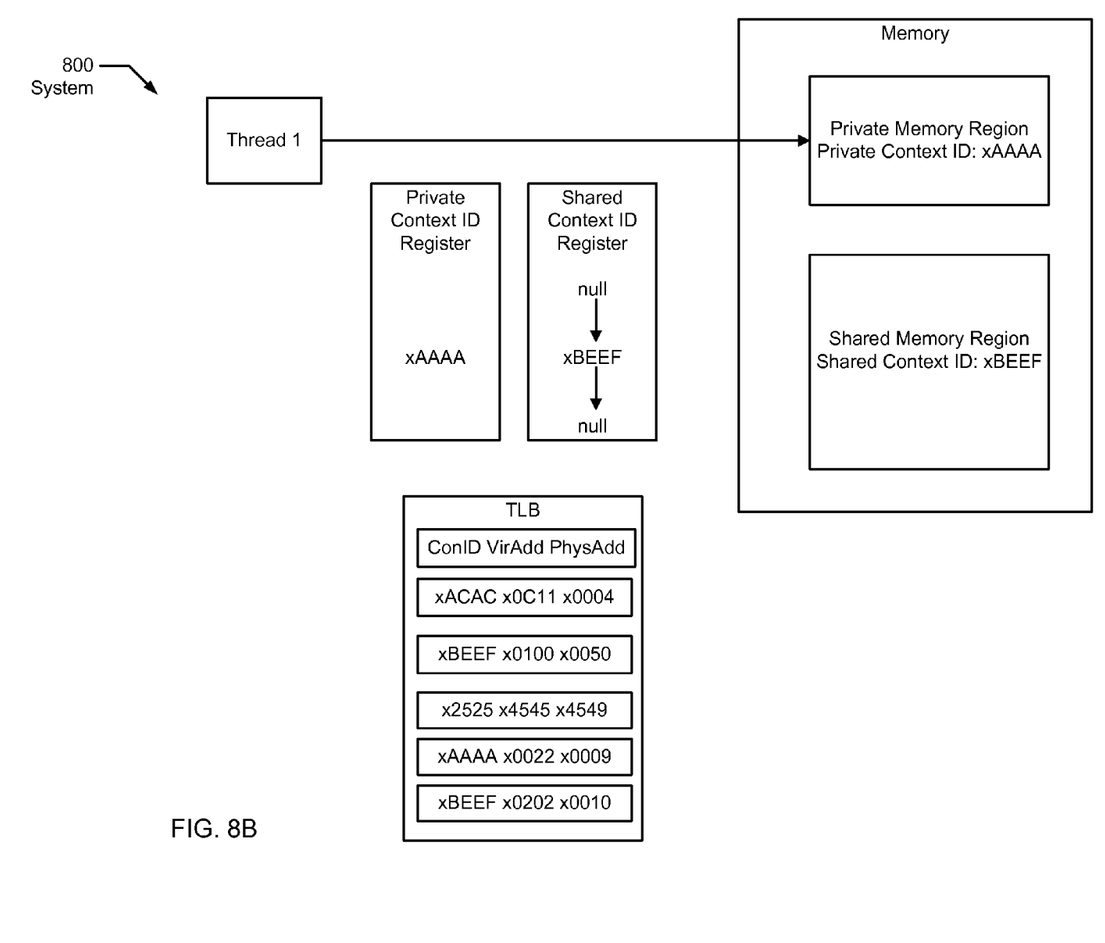

Referring to FIGS. 8A-B, an example in accordance with one or more embodiments of the invention is shown. This example is not intended to limit the scope of the invention or the claims.

Consider a scenario in which there is a thread executing a code section that requires access to a shared memory region. As shown in FIG. 8A, the system (800) includes a private memory region and a shared memory region. The private memory region and the shared memory region do not overlap with each other. In this example, the shared memory region is a database with bank account information. The shared context ID for the shared memory region is xBEEF and the private context ID for the private memory region is xAAAA. The application code has been modified to include instructions to enable and disable access to the shared memory region in all appropriate code sections. The private context ID register begins with a value of xAAAA and the shared context ID register begins with a value of null. As shown on FIG. 8A, the TLB includes 5 TLB entries of format [Context ID, Virtual Address, Physical Address].

Referring to FIG. 8A, Thread 1 executes a routine that includes a write operation to the database at virtual address x0202. In the routine, the thread executes instructions to generate a request to the operating system to enable access to the database for Thread 1. In response to the request, the operating system loads the value xBEEF into the shared context ID register. The MMU checks for TLB entries with a virtual address of x0202 and a context ID of xAAAA or xBEEF. The MMU finds an entry with a context ID of xBEEF, a virtual address of x0202, and a physical address of x0010. With access to the shared memory region enabled, Thread 1 continues to execute instructions in the routine and writes new bank account information to the database at physical address x0212. Memory accesses to the shared memory region result in TLB entries with a context ID of xBEEF.

Referring to FIG. 8B, the system (800) includes the private memory region and the shared memory region shown in FIG.

8A. While continuing to execute instructions in the routine, Thread 1 executes instructions to send a request to the operating system to disable access for Thread 1. In response to the request, the operating system removes the shared context ID from the shared context ID register. Thread 1 may no longer access the shared memory region nor use TLB entries with a context ID of xBEEF.

Figure 9A:
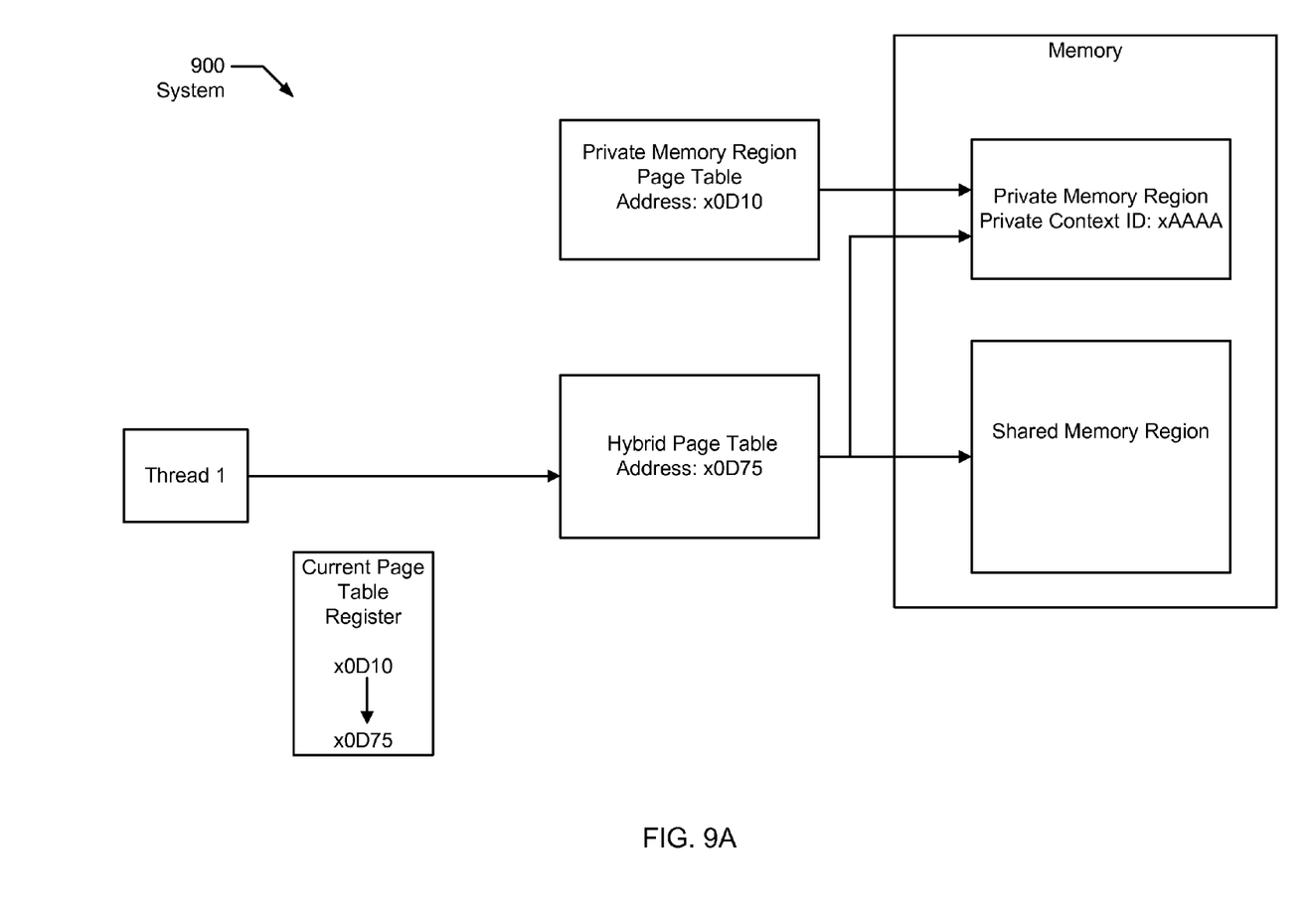
FIGS. 9A-B show an example in accordance with one or more embodiments of the invention.
Figure 9B:
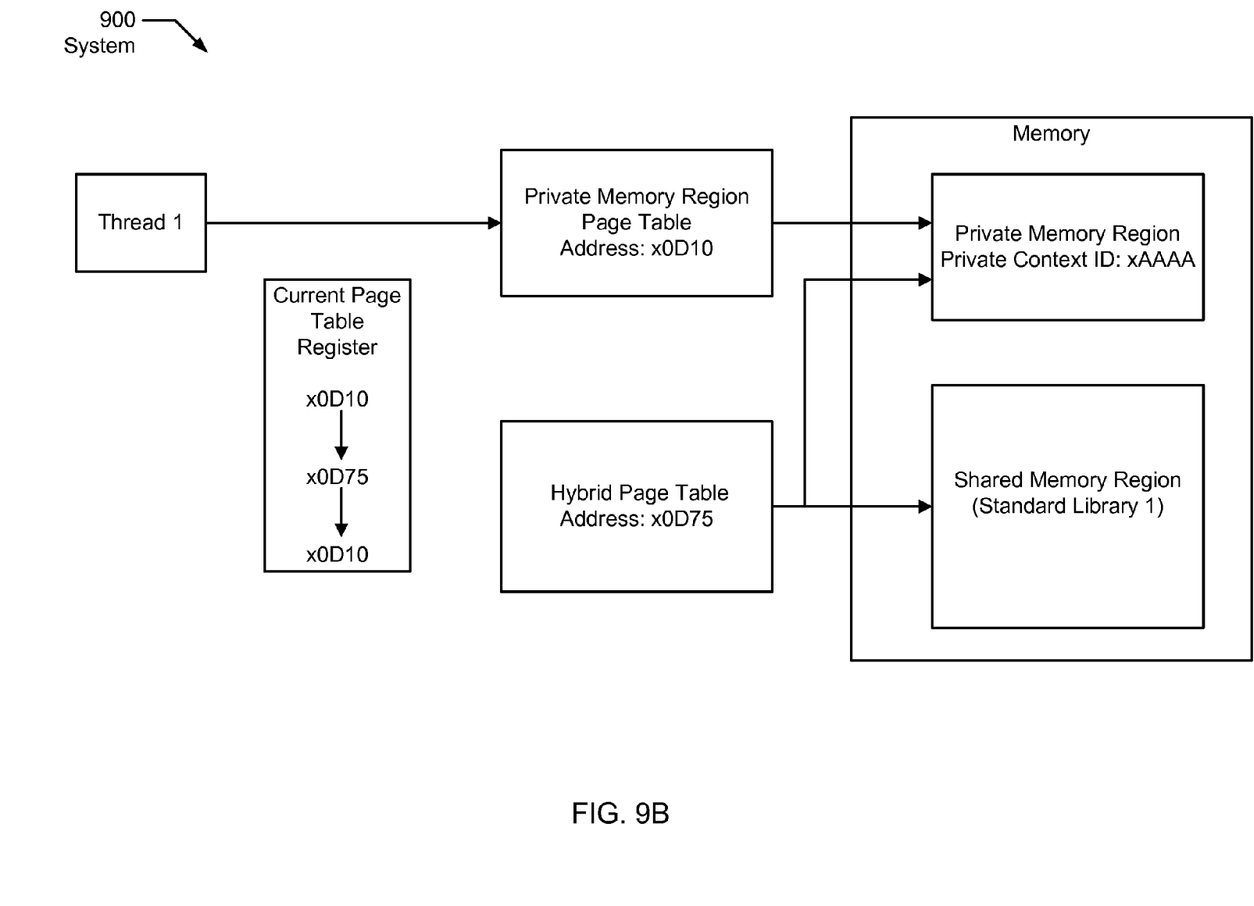

Referring to FIGS. 9A-B, an example in accordance with one or more embodiments of the invention is shown. This example is not intended to limit the scope of the invention or the claims.

Consider a scenario in which there is a thread executing a code section that requires access to a shared memory region. As shown in FIG. 9A, the system (900) includes a private memory region and a shared memory region. The private memory region and the shared memory region do not overlap with each other. In this example, the shared memory region is a library with mathematical functions. The hybrid memory page table has an address of x0D75 and the private memory page table has an address of x0D10. The application code has been modified to include instructions to enable and disable access to the shared memory region in all appropriate code sections. The current page table register begins with a value of x0D10 as shown in FIG. 9A.

Referring to FIG. 9A, Thread 1 executes a routine that includes a read operation from the library at virtual address x0111. In the routine, the thread executes instructions to generate a request to the operating system to enable access to the library for Thread 1. In response to the request, the operating system loads the value x0D75 into the current page table register. The MMU uses the hybrid memory page table to determine that the corresponding physical address is x0222. With access to the shared memory region enabled, Thread 1 continues to execute instructions in the routine and reads a mathematical function from the library at physical address x0222. While access to the shared memory region is enabled, any memory accesses result in TLB entries with a context ID of x0D75.

Referring to FIG. 9B, the system (900) includes the private memory region and the shared memory region shown in FIG. 9A. While continuing to execute instructions in the routine, Thread 1 executes instructions to send a request to the operating system to disable access for Thread 1. In response to the request, the operating system loads the private page table address into the current page table register. The MMU then loads x0D10 into the current page table register. Thread 1 may no longer access the shared memory region and is restricted to accessing the private memory region. Thread 1 may not use TLB entries with a context ID of x0D75.

One or more embodiments of the invention may be implemented on a multi-threaded system in which each of the threads is associated with a private context ID and a corresponding private memory region. Further, one or more of the threads may also be granted access to one or more shared memory regions using the corresponding shared context ID.

Software instructions to perform embodiments of the invention may be stored on a non-transitory computer readable medium such as a magnetic storage, optical storage, solid state storage, or any other computer readable storage device. Further, such instructions may be executed by a processor(s) as described above.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for accessing shared memory, the method comprising:
    loading a first private context ID into a private context ID register, wherein the first private context ID enables a first thread to access a first private memory region only accessible by the first thread;
    receiving, from the first thread, a first request to access a shared memory region;
    in response to the first request, loading a shared context ID into a shared context ID register;
    permitting, by a memory management unit (MMU), the first thread to access the shared memory region using the shared context ID;
    receiving, from the first thread, a second request to disable access to the shared memory region; and
    removing, in response to the second request, the shared context ID from the shared context ID register, wherein after removing the shared context ID from the shared context ID register the first thread is no longer able to access the shared memory region.

2. The method of claim 1, further comprising:
    loading a second private context ID into the private context ID register, wherein the second private context ID enables a second thread to access a second private memory region only accessible by the second thread;
    receiving, from the second thread, a third request to access the second private memory region;
    in response to the third request, permitting, by the MMU, the second thread to access the second private memory region using the second private context ID, wherein the second thread cannot access the shared memory region and wherein the second thread cannot access the first private memory region.

3. The method of claim 1, further comprising:
    prior to receiving the first request:
        identifying the shared memory region.

4. The method of claim 1, wherein the shared memory region and the first private memory region are non-overlapping regions of memory.

5. A method for accessing shared memory, the method comprising:
    receiving, from a first thread, a first request to access a shared memory region;
    in response to the first request:
        loading a first page table address into a current page table register, wherein the first page table address enables the first thread to access a first private memory region associated with the first thread and to access the shared memory region;
    permitting, by a memory management unit (MMU), the first thread to access the shared memory region using the first page table address;
    receiving, from the first thread, a second request to disable access to the shared memory region;
    removing, in response to the second request, the first page table address from the current page table register, wherein after removing the first page table address from the current page table register the first thread is no longer able to access the shared memory region; and
    loading, after the removing, a second page table address into the current page table register, wherein the second page table address enables the first thread to access only the first private memory region.

6. The method of claim 5, further comprising:
receiving, from a second thread, a third request to access a second private memory region;
in response to the third request:
loading a third page table address into the current page table register, wherein the third page table address enables the second thread to access the second private memory region associated with the second thread; and
permitting, by the MMU, the second thread to access the second private memory region using the third page table address, wherein the second thread cannot access the shared memory region and wherein the second thread cannot access the first private memory region.

7. The method of claim 5, further comprising:
receiving, from a second thread, a third request to access the shared memory region;
in response to the third request:
loading the third page table address into the current page table register, wherein the third page table address enables the second thread to access a second private memory region only accessible by the second thread and to access the shared memory region;
permitting, by the MMU, the second thread to access the shared memory region using the third page table address;
receiving, from the second thread, a fourth request to disable access to the shared memory region;
removing, in response to the second request, the third page table address from the current page table register, wherein after removing the third page table address from the current page table register the second thread is no longer able to access the shared memory region;
loading, after the removing, a fourth page table address into the current page table register, wherein the fourth page table address enables the second thread to access only the second private memory region.

8. The method of claim 5, wherein the first page table address is associated with a hybrid page table that includes pages from the shared memory region and the first private memory region.

9. A system for improving access permissions, comprising:
a private context ID register;
a shared context ID register;
a shared memory region, wherein access to the shared memory region is managed by an operating system and a memory management unit (MMU);
a first private memory region, wherein the first private memory region is managed by the operating system and the MMU;
the operating system configured to:
load a first private context ID into the private context ID register, wherein the first private context ID enables a first thread to access a first private memory region only accessible by the first thread,
receive, from the first thread, a first request to enable access to the shared memory region,
in response to the first request, load a shared context ID into the shared context ID register,
receive, from the first thread, a second request to disable access to the shared memory region, and
remove, in response to the second request, the shared context ID from the shared context ID register, wherein after removing the shared context ID from the shared context ID register the first thread is no longer able to access the shared memory region;
the memory management unit (MMU) configured to:
permit the first thread to access the shared memory region using the shared context ID; and
an application comprising:
the first thread configured to:
send, to the operating system, the first request to enable access to the shared memory region, and
send, to the operating system, the second request to disable access to the shared memory region.

10. The system of claim 9, further comprising:
a second thread, further configured to:
send, to the operating system, a third request to access a second private memory region;
the operating system, further configured to:
load a second private context ID into the private context ID register, wherein the second private context ID enables the second thread to access the second private memory region only accessible by the second thread; and
the MMU, further configured to:
permit, in response to the third request, the second thread to access the second private memory region using the second private context ID, wherein the second thread cannot access the shared memory region and wherein the second thread cannot access the first private memory region.

11. The system of claim 9, further comprising:
the application, prior to sending the first request, further configured to:
identify the shared memory region.

12. The system of claim 9, wherein the shared memory region and the first private memory region are non-overlapping regions of memory.

13. The system of claim 9, wherein the application comprises a section of code which when executed by the first thread results in access to the shared memory region, wherein the application comprises a first instruction which when executed by the first thread generates the first request and a second instruction which when executed generates the second request, wherein the first instruction is located in one location selected from a group consisting of prior to the section of code and in the section of code, and wherein the second instruction is located in one location selected from a group consisting of after the section of code and in the section of code.

14. A system for improving access permissions, comprising:
a current page table register;
a shared memory region, wherein access to the shared memory region is managed by an operating system and a memory management unit (MMU);
a first private memory region, wherein the first private memory region is managed by the operating system and the MMU;
the operating system configured to:
receive, from a first thread, a first request to enable access to the shared memory region,
in response to the first request:
load a first page table address into the current page table register, wherein the first page table address enables the first thread to access the first private memory region associated with the first thread and to access the shared memory region;
receive, from the first thread, a second request to disable access to the shared memory region,
remove, in response to the second request, the first page table address from the current page table register, wherein after removing the first page table address from the current page table register the first thread is no longer able to access the shared memory region, and load, after removing, a second page table address into the current page table register, wherein the second page table address enables the first thread access to only the first private memory region;

the memory management unit (MMU) configured to:
permit the first thread to access the shared memory region using the first page table address; and an application comprising:
the first thread configured to:
send, to the operating system, the first request to enable access to the shared memory region, and
send, to the operating system, the second request to disable access to the shared memory region.

15. The system of claim 14, further comprising:
the operating system, further configured to:
receive, from a second thread, a third request to access a second private memory region,
in response to the third request:
loading a third page table address into the current page table register, wherein the third page table address enables the second thread to access the second private memory region associated with the second thread; and
the MMU, further configured to:
permit the second thread to access the second private memory region using the third page table address, wherein the second thread cannot access the shared memory region and wherein the second thread cannot access the first private memory region.

16. The system of claim 14, further comprising:
the operating system, further configured to:
receive, from a second thread, a third request to access the shared memory region, in response to the third request:
load a third page table address into the current page table register, wherein the third page table address enables the second thread to access a second private memory region only accessible by the second thread and to access the shared memory region,
receive, from the second thread, a fourth request to disable access to the shared memory region,
remove, in response to the fourth request, the third page table address from the current page table register, wherein after removing the third page table address from the current page table register the second thread is no longer able to access the shared memory region, and
load, after the removing, a fourth page table address into the current page table register, wherein the fourth page table address enables the second thread to access only the shared memory region; and
the MMU, further configured to:
permit the second thread to access the shared memory region using the third page table address.

17. The system of claim 14, wherein the first page table address is associated with a hybrid page table that includes pages from the shared memory region and the first private memory region.

18. A non-transitory computer readable medium comprising instructions, which when executed by a processor perform a method for accessing shared memory, the method comprising:
loading a first private context ID into a private context ID register, wherein the first private context ID enables a first thread to access a first private memory region only accessible by the first thread;
receiving, from the first thread, a first request to access a shared memory region;
in response to the first request, loading a shared context ID into a shared context register;
permitting, by a memory management unit (MMU), the first thread to access the shared memory region using the shared context ID;
receiving, from the first thread, a second request to disable access to the shared memory region; and
removing, in response to the second request, the shared context ID from the shared context ID register, wherein after removing the shared context ID from the shared context ID register the first thread is no longer able to access the shared memory region.

19. The non-transitory computer readable medium of claim 18, the method further comprising:
receiving, from a second thread, a third request to access a second private memory region;
in response to the third request:
loading a second private context ID into the private context ID register, wherein the second private context ID enables the second thread to access the second private memory region only accessible by the second thread; and
permitting, by the MMU, the second thread to access the second private memory region using the second private context ID, wherein the second thread cannot access the shared memory region and wherein the second thread cannot access the first private memory region.

20. The non-transitory computer readable medium of claim 18, the method further comprising:
prior to receiving the first request, identifying the shared memory region.

* * * * *